Nov. 12, 1968    E. L. MOSES    3,410,122

ANTI-THEFT LOCK FOR VEHICULAR RADIOS AND TAPE PLAYERS

Filed Dec. 22, 1967

INVENTOR
Elvis L. Moses

BY *Ihley & Ihley*

ATTORNEYS

United States Patent Office 3,410,122
Patented Nov. 12, 1968

3,410,122
ANTI-THEFT LOCK FOR VEHICULAR RADIOS
AND TAPE PLAYERS
Elvis L. Moses, 156 Farmers Branch Shopping Center,
Dallas, Tex. 75234
Filed Dec. 22, 1967, Ser. No. 692,765
8 Claims. (Cl. 70—58)

ABSTRACT OF THE DISCLOSURE

A pair of lock elements which may be attached to the mounting bracket of a vehicular radio or tape player and locked thereon to prevent theft of the radio or tape player.

BACKGROUND OF THE INVENTION

Field of the invention

There have currently come into relatively widespread use in vehicles such as automobiles, trucks and the like, tape players, particularly stereo tape players, short wave radios and other sound receiving or reproducing units which are in addition to the usual vehicular radios which are installed as a more or less integral part of the vehicle. In general, these units are attached to the vehicle as an auxiliary unit, as under the dashboard or some other portion of the vehicle, and are readily removable. Concurrently, there has arisen the problem of the theft of such units from the vehicles due to their ready access and ease of removal. In most instances, and especially with tape players, it is only necessary to remove a few nuts holding the unit in place and the clipping of its power lead, and therefore the theft of such units has become an appreciable problem. The present invention is directed to a lock which completely encloses the fastening or securing means for the unit, preventing access thereto, and therefore preventing theft thereof without actual physical destruction of the lock member. The lock comprises contoured lock elements adaptable to the bracket on which the unit is mounted which overlie the securing means for the unit, there being two elements in the lock means, releasably locked together, and so arranged as to cooperate with the bracket so that they cannot be removed to an extent sufficient to allow access to the securing means for the unit and thus preventing the quick and easy removal of the unit as presently is possible.

Description of the prior art

The prior art known to the applicant is as follows: De Waldo, 716,204; Thompson et al., 1,208,236; Obreiter, 1,577,292; Morreale et al., 1,919,701; Binz, 2,479,300; Parker, 2,500,375; Tenner, 2,529,432; Will, 2,596,802; Stiler, 2,655,806; Pegg et al., 2,791,898.

None of these prior patents is applicable to vehicle radios, or to tape player units, and the like, or solves the problem of preventing the relatively easy theft thereof.

SUMMARY OF THE INVENTION

The invention is directed to an anti-theft lock for vehicle radios and tape player units of the type in which the unit is mounted by its end walls on a bracket by securing means which are normally exposed and readily removable so that the unit can be quickly and easily released and stolen. The lock includes cover elements which interlock with the mounting bracket for the unit, and which cover the securing means and are releasably locked together so as to preclude unauthorized removal of the unit without physical destruction of the lock, the lock being so constructed as to interconnect it with the bracket on which the unit is mounted and/or the securing means therefor so that, for all practical purposes, the unit cannot be removed from the vehicle short of releasing the lock.

DESCRIPTION OF THE PREFERRED EMBODIMENT

Figure 1:
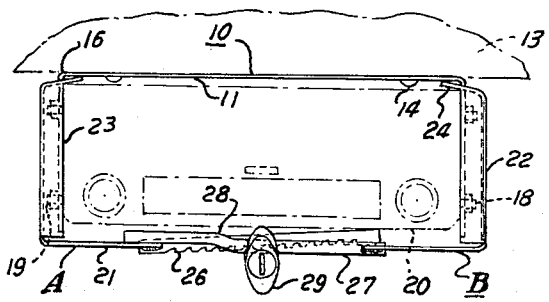
FIG. 1 is a front elevational view of a lock constructed in accordance with the invention, in coacting relation to the mounting bracket of a vehicular radio or tape player unit, the latter being shown in broken lines.
Figure 2:
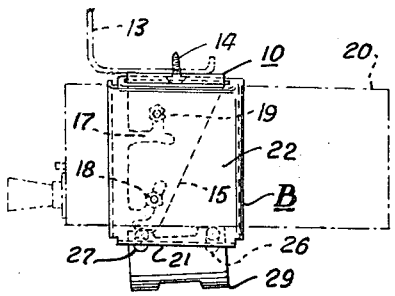
FIG. 2 is an end elevational view of the lock, mounting bracket and unit.
Figure 3:
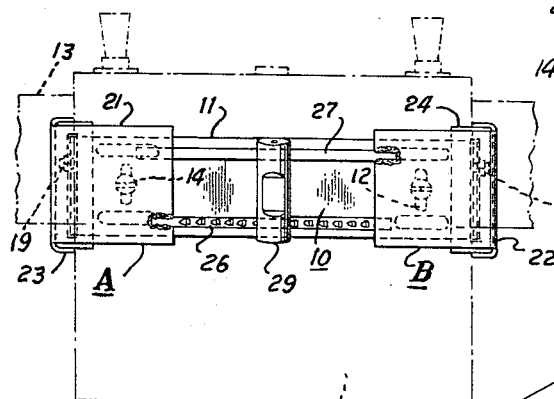
FIG. 3 is a bottom plan view of the lock, bracket and unit.
Figure 4:
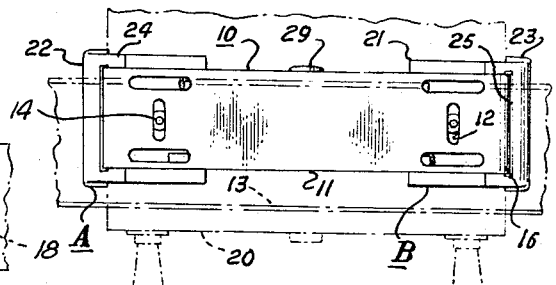
FIG. 4 is a top plan view of the lock, bracket and unit.

In the drawing, the numeral 10 designates a conventional bracket upon which vehicular radios, particularly tape player units, are mounted. The bracket includes a transverse plate 11 having a plurality of slots or openings 12 therein by which the bracket may be secured in the desired location in the vehicle, usually under the dashboard 13 thereof, suitable securing means such as bolts or metal screws 14 being utilized therefor. The conventional bracket 10 has a leg 15 at each end thereof, the plate 11 having arcuate junctures 16 with the legs 15, the latter having contoured slots 17 for reception and adjustment of screwthreads pins 18 conventionally extending from the walls of the radio or player unit and which receive securing nuts 19 outwardly of said legs to position the unit in place. Normally, the nuts 19 are readily accessible and easily removable so that the radio or player units 20 may quickly and easily be removed for servicing or replacement but which also facilitate the easy theft of the unit.

The present invention comprises a lock having two elements A and B, each element having a first plate 21 adapted to adjoin one wall of the radio or player unit, normally the bottom wall thereof, and a second plate 22 extending at right angles to the first plate 21 for overlying the end walls of the unit together with the securing means for the unit, namely the bolts 18 and nuts 19. The second plate 22 have at both marginal edges narrow flanges 23 which extend at right angles to the second plates 22 and the first plates 21 and, which, as will appear more fully, overlie the gap between the second plates 22 and the outer faces of the legs 15, thus effectively preventing access to the nuts 19.

At the upper end of each of the second plates 22, there is provided a slotted flange 24, having therein a longitudinal slot 25, the flanges 24 being disposed between or adjoining the narrow flanges 23 and being approximately parallel to the first plate 21 or inclined slightly away from the plane of the first plate, the narrow flanges 23 and the slotted flanges 24 extending from the second plates 22 in the same direction as the first plates 21. The legs 15 of the bracket 10 are received in the slots 25, and thus portions of the slotted flanges 24 necessarily overlie the unit 20 so that when the elements A and B are fully telescoped on the legs 15, downward movement of the elements from the legs is precluded. The slots 25 may be of any desired width, and preferably are sufficiently narrow as to preclude the passage of the securing elements 18 and 19 therethrough, but since the slotted flanges 24 necessarily overlie said securing elements, downward movement of the elements A and B from the legs is prevented.

Figure 5:
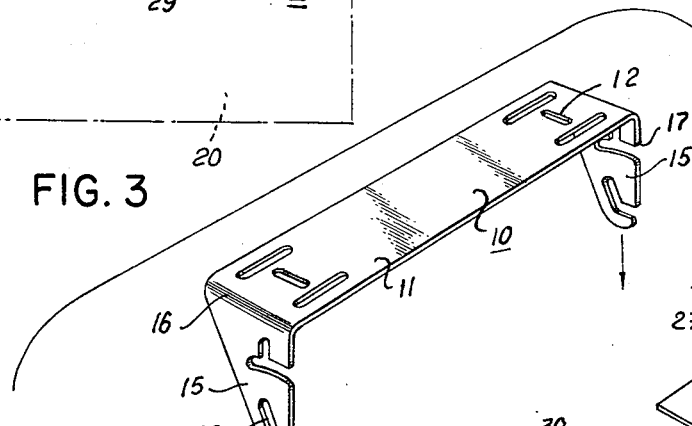
FIG. 5 is an exploded view in perspective of the lock and unit mounting bracket.

For releasably securing or locking the elements A and B together, one of the elements, as shown in FIG. 5, the element A, carries an elongate notches bar 26 extending from the first plate 21 thereof and in the plane of the first plate 21, and in locking or securing relationship, toward the first plate 21 of the element B. The first plate of the other element, in the illustration shown, the element B, carries an elongate bar 27 extending therefrom in the plane of the first plate of the second element and having a joggle or offset 28 intermediate its ends. The bars 26 and 27 are offset laterally and extend generally in parallelism to one another and to the first plates 21.

A detent or bicycle lock 29 has a detent aperture 30 for receiving the notched bar 26, and a second aperture 31 through which the bar 27 is slidable, the lock 29 being positioned between the offset 28 and the first plate of the element B so that the lock is slidable upon the bar 27 but may not be removed therefrom. The lock 29 includes conventional detent means (not shown) for engaging the notches of the notches bar 26 and which permit sliding of the notched bar 26 through the aperture 32 but prevent removal of the notched bar therefrom until the lock is released.

In practice, the bracket 10 is secured to the vehicle in the desired position, normally below the dashboard 13 thereof, and the elements A and B, not locked together, are positioned thereon by sliding them upwardly on the legs 15 through the notches 25. The elements A and B may be canted away from the legs 15 and the radio or tape player unit 20 positioned between the legs 15 and secured in the slots 17 thereof. Then the elements A and B are swung inwardly toward the legs 15 so as to overlie the fastening elements 18 and 19, the notches bar 26 being engaged in the detent aperture 30, and the elements A and B moved fully into confining position, the lock 29 engaging to hold them in such a position and preventing their removal and preventing access to the fastening elements. Thus, it is not possible to remove the unit 20 without removing the lock 29 or physically destroying the elements A and B or the bars 26 and 27 thereof. The latter may desirably be formed of hardened steel or a similar material so as to render difficult their severance by a hacksaw or the like.

Access to the fastening or securing elements 18 and 19 being thus prevented or precluded, theft or unauthorized removal of the unit 20 without a key to release the lock 29 is rendered extremely difficult.

The slotted flanges 24 may be parallel to the first plates 21, but are desirably inclined slightly away from the first plates 21, and this, together with the arcuate juncture 16 between the plate 11 and the legs 15 facilitates the canting of the elements A and B away from the legs during installation, and also permits the slots 25 to be narrower than might be otherwise required.

The foregoing description of the invention is explanatory thereof and various changes in the size, shape and materials, as well as in the details of the illustrated construction may be made, within the scope of the appended claims, without departing from the spirit of the invention.

I claim:

1. An anti-theft lock for vehicle radio and tape player units of the type in which the unit has end walls and is mounted on a bracket, the bracket having a transverse plate with means for securing it to the vehicle, the transverse plate having a leg at each end extending at right-angles from the plate in parallelism, and means for securing the unit between the legs by its end walls, said latter means normally being readily accessible from the outer faces of the legs for installation and removal of the unit, the lock overlying the unit securing means for preventing access thereto and including a pair of elements, each element having a first plate for adjoining one wall of the unit, a second plate extending at right angles to the first plate for overlying the end walls of the unit and securing means therefor, narrow flanges at right angles to the first and second plates for overlying the spaces between the second plate and one leg of the bracket, a slotted flange extending from the second plate at the end of the second plate opposite the first plate and adjoining the narrow flanges approximately parallel to the first plate, the slotted flange of each element being adapted to receive one of the end legs of the bracket, and means for releasably locking the two first plates together, the slotted flanges preventing removal of the legs from the slotted flanges sufficient to permit access to the securing means for the unit.

2. A lock as set forth in claim 1 wherein the slotted flanges have a portion adapted to overlie the wall of the unit adjoining the plate of the bracket.

3. A lock as set forth in claim 1 wherein the junctures between the bracket plate and the bracket legs are arcuate and the slotted flanges extend at a slight angle away from the plane of the first plates of the lock elements.

4. A lock as set forth in claim 1 wherein the slots in the slotted flanges are too narrow to pass the unit securing means.

5. A lock as set forth in claim 1 wherein the locking means includes a notched bar extending from one of the first plates, a bar extending from the other of the first plates, a detent lock having a detent aperture in which the notched bar is slidable and lockable and a second aperture for receiving the bar of the other of said first plates in irremovable fashion.

6. A lock as set forth in claim 5 wherein the two bars extend in substantial parallelism with the first plates of the lock elements.

7. A lock as set forth in claim 5 wherein the two bars extend in substantial parallelism with the first plates of the lock elements and each other.

8. A lock as set forth in claim 5 wherein the bar of the other of said first plates is offset so that the detent lock may slide thereon but cannot be removed therefrom.

References Cited

UNITED STATES PATENTS

| | | | |
|---|---|---|---|
| 153,673 | 8/1874 | Fox | 70—57 |
| 3,370,446 | 2/1968 | Francis | 70—58 |

MARVIN A. CHAMPION, *Primary Examiner.*

R. L. WOLFE, *Assistant Examiner.*